United States Patent [19]
Fleming, Jr.

[11] Patent Number: 5,672,192
[45] Date of Patent: Sep. 30, 1997

[54] METHOD OF MAKING OPTICAL FIBER USING A PLASMA TORCH FIBER-DRAWING FURNACE

[75] Inventor: James William Fleming, Jr., Westfield, N.J.

[73] Assignee: Lucent Technologies Inc., Murray Hill, N.J.

[21] Appl. No.: 655,580

[22] Filed: May 30, 1996

[51] Int. Cl.$^6$ .................................................. C03B 37/027
[52] U.S. Cl. ............................................ 65/391; 65/435
[58] Field of Search ............................ 65/391, 435, 537, 65/436

[56] References Cited

U.S. PATENT DOCUMENTS

| | | | |
|---|---|---|---|
| 4,575,463 | 3/1986 | Biswas | 65/435 |
| 5,194,714 | 3/1993 | Lesergent | 65/391 |
| 5,320,660 | 6/1994 | Breuls | 65/435 |
| 5,397,372 | 3/1995 | Partus | 65/391 |

*Primary Examiner*—John Hoffmann

[57] ABSTRACT

In accordance with the invention, an optical fiber is made by the steps of providing an optical fiber preform having a longitudinal axis, rotating the preform about the axis, directing onto the preform a plasma torch which is reciprocated over a limited region parallel to the axis to define a heated region, and drawing a fiber from the heated region. Apparatus for making optical fiber comprises a rotatable mount for securing one end of a preform and rotating it about a vertical axis, a plasma torch for heating a drawing region on the preform, a positioning stage for moving the torch parallel to the vertical axis in a reciprocating manner, and a fiber drawing apparatus for drawing a fiber from the heated region of the preform.

5 Claims, 1 Drawing Sheet

METHOD OF MAKING OPTICAL FIBER USING A PLASMA TORCH FIBER-DRAWING FURNACE

FIELD OF THE INVENTION

This invention relates to a method for making optical fiber from optical fiber preforms using a plasma torch and to related apparatus.

BACKGROUND OF THE INVENTION

Optical fiber are thin strands of glass capable of transmitting an optical signal containing a large amount of information over long distances with very low loss.

Optical fibers are typically manufactured by constructing an optical fiber preform of appropriate composition and drawing fiber from the preform. A typical preform is a concentric glass rod having a length of about one meter and an outer diameter of 20-200 mm. The inner core of the rod is a high purity, low loss glass such as germanium silicate glass having a diameter of about 1-5 mm. The concentric outer cylinder, referred to as cladding, is a layer of glass with a lower index of refraction than the inner core.

In the conventional manufacture of an optical fiber, the preform is lowered into the insulated susceptor of an RF induction furnace where it is heated to a high drawing temperature. A strand of glass is pulled from the heated portion of the preform at a tension and rate to draw a fiber of desired diameter.

One the primary difficulties with this conventional process is contamination of the fiber from the materials of the induction furnace. Even very small particulates from the insulation or susceptor can produce localized weak points in the fiber which will ultimately result in breakage or other forms of failure.

U.S. Pat. No. 4,440,556 issued to S. M. Oh et al. describes an early attempt to solve this contamination problem by directing a plasma torch axially onto a preform and drawing a fiber axially through a central passage in the torch. The difficulty with this approach is that to reach the central passage, the drawn fiber must pass through the plasma fireball. But plasma shapes are notoriously difficult to control, and even minor fluctuations in shape can subject the delicate drawn fiber to severe temperature fluctuations. A second difficulty arises from the use of increasingly larger diameter preforms. With larger diameter preforms it is very difficult to generate a sufficiently large plasma fireball to cover the entire diameter of the preform. The result is non-uniform heating in the drawing region. Accordingly there is a need for a new method of fiber manufacture which avoids contamination and undesirable temperature variations.

SUMMARY OF THE INVENTION

In accordance with the invention, an optical fiber is made by the steps of providing an optical fiber preform having a longitudinal axis, rotating the preform about the axis, directing onto the preform a plasma torch which is reciprocated over a limited region parallel to the axis to define a heated region, and drawing a fiber from the heated region. Apparatus for making optical fiber comprises a rotatable mount for securing one end of a preform and rotating it about a vertical axis, a plasma torch for heating a drawing region on the preform, a positioning stage for moving the torch parallel to the vertical axis in a reciprocating manner, and a fiber drawing apparatus for drawing a fiber from the heated region of the preform.

BRIEF DESCRIPTION OF THE DRAWINGS

The advantages, nature and various additional features of the invention will appear more fully upon consideration of the illustrative embodiments now to be described in detail in connection with the accompanying drawings. In the drawing.

It is to be understood that these drawings are for purposes of illustrating the concepts of the invention and are not to scale.

DETAILED DESCRIPTION

Figure 1:
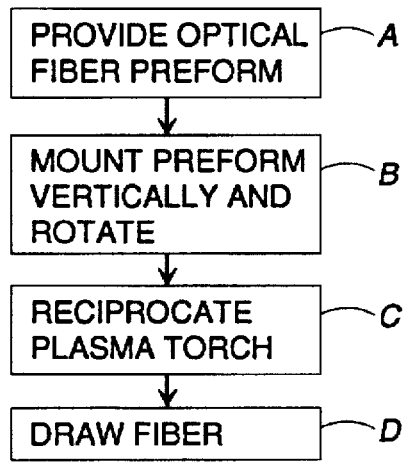
FIG. 1 is a block diagram of the method for making optical fiber in accordance with the invention.

Referring to the drawings, FIG. 1 is a block diagram showing the steps for making optical fiber from an optical fiber preform in accordance with a preferred embodiment of the invention. As shown in block A of FIG. 1, the first step is to provide an optical fiber preform. The preform can be a conventional preform, as previously described, which has a longitudinal axis ideally running through the center of the core region of the preform.

The next step, shown in block B, is to mount the preform with its longitudinal axis in a vertical position and to rotate the preform about the axis.

The third step (block C) is to dispose adjacent the rotating preform a plasma torch which is reciprocated parallel to the axis over a limited length to heat a drawing region of the preform.

Optical fiber is then drawn from the torch-heated region in the conventional manner (block D).

Figure 2:
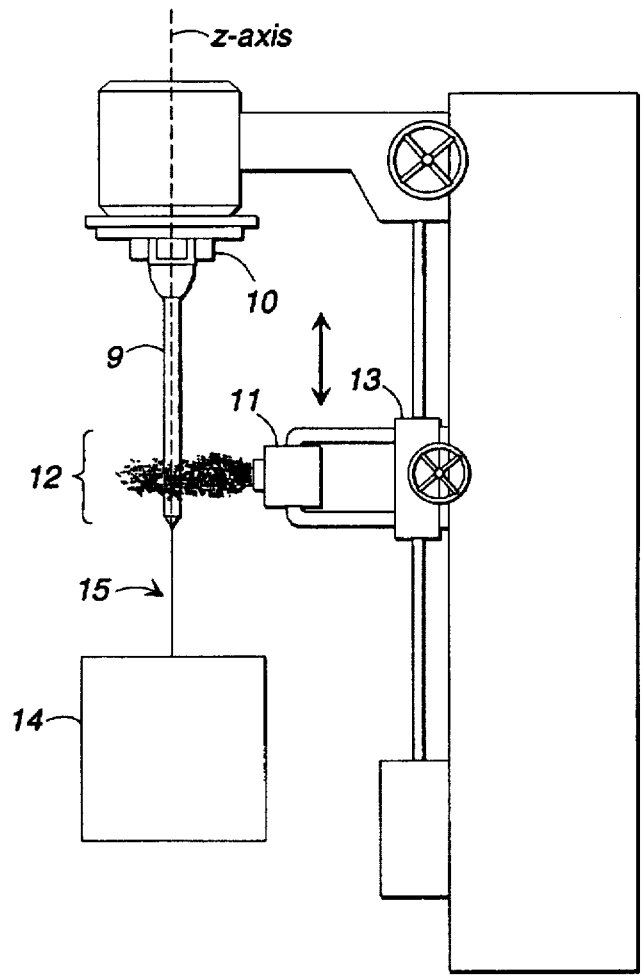
FIG. 2 schematically depicts apparatus for making optical fiber in accordance with the invention.

Apparatus for practicing this method is illustrated in FIG. 2 wherein an optical fiber preform 9 is shown secured at one end by a rotatable mount 10, such as a lathe head, for rotating the preform about a vertically aligned longitudinal axis Z. A plasma torch 11 for heating a drawing region 12 in preform 9 is mounted on a positioning stage 13 for moving the torch parallel to the Z-axis in a reciprocating manner. A conventional fiber drawing apparatus 14 is provided for drawing a fiber 15 from the heated drawing region 12.

In the preferred form, mount 10 is one head of a Litton Glass Lathe marketed by Litton Engineering Co. To provide controllable rotation speed, the standard chuck rotation motor was replaced by a stepmotor, such as a Model M106-205 stepmotor marketed by Compu Motor Division of Parker Hannifin Corp., Petaluma, Calif.

Plasma torch 11 is preferably a plasma torch for generating a high temperature plasma fireball 11A such as is described in detail in applicant's U.S. Pat. No. 5,000,771 issued Mar. 29, 1991, which is incorporated herein by reference.

The positioning stage 13 is preferably a three-axis positioning stage driven by additional stepmotors. Operation of the preform rotation and torch traverse stepmotors can be accomplished under control of a computer (not shown) such as an AT&T PC 6300 equipped with a Compu Motor PC-23 Motor Indexer. The torch positioning apparatus is similar to that described in applicant's U.S. Pat. No. 5,221,306 issued Jun. 22, 1993, which is incorporated herein by reference.

The fiber drawing apparatus 14 can be a conventional fiber drawing station such as described in *Optical Fiber Telecommunications*, Ed. S. E. Miller and I. P. Kaminow (Academic Press, 1988), pp. 182–185 which is incorporated herein by reference. Fiber drawing speed and tension can be under control of the same computer used to control rotation and torch traversal.

In typical operation, an optical preform is fixed to mount 10 and rotated at a desired speed. Torch 11 is centered at the desired drawing region 12 and ignited while reciprocating. The torch is directed toward the preform center with the fireball just touching the outer surface. Upon sufficient heating, a melted end portion bearing a glass strand drops, and the strand is inserted into the drawing station 14. The parameters are then adjusted to produce a fiber of desired diameter and uniformity. Typically, the preform is rotated in the range 5 to 50 rpm, and the torch is reciprocated up and down at an amplitude in the range 1 to 10 in. at a frequency in the range 1 to 5 cycles/sec.

The invention will be more clearly understood upon consideration of the following specific example.

EXAMPLE

A 40 mm diameter preform 800 mm in length was put into a rotatable chuck located above a plasma torch. The preform axis was centered on and perpendicular to the torch axis. The plasma torch was made to oscillate vertically in a sinusoidal pattern having a period of 4 seconds and amplitude of 6 cm. Simultaneously, the preform was rotated at 30 rpm. The plasma was positioned such that the end of the torch was 8 cm from the surface of the preform. An oxygen plasma was initiated in the torch and brought to about 50 kW input power. Within a few minutes, the preform end became sufficiently fluid for a drop to form and create a neckdown region at the bottom of the preform. Once this occurred, the preform was traversed downward at 2 m/min. Simultaneously, fiber having a diameter of approximately 125 microns was drawn at a rate of 3.5 m/sec.

It is to be understood that the above-described embodiments are illustrative of only a few of the many possible specific embodiments which can represent applications of the principles of the invention. Numerous and varied other arrangements can be readily devised in accordance with these principles by those skilled in the art without departing from the spirit and scope of the invention.

I claim:

1. A method of making an optical fiber from an optical fiber preform, comprising the steps of providing an optical fiber preform having a longitudinal axis;

rotating said preform about said longitudinal axis;

directing onto said preform a plasma torch which is reciprocated parallel to said axis over a limited region of said preform to define a heated drawing region; and drawing optical fiber from said heated drawing region.

2. The method of claim 1 wherein said longitudinal axis is aligned in the vertical direction.

3. The method of claim 1 wherein said rotating is at a rotational speed in the range of 5 to 50 rpm.

4. The method of claim 1 wherein said reciprocating an amplitude in the range of 1 to 10 in.

5. The method of claim 1 wherein said reciprocating frequency in the range of 1 to 5 cycles/sec.

* * * * *